J. R. DU PRIEST.
CONNECTING ROD.
APPLICATION FILED OCT. 8, 1920.
1,417,307.
Patented May 23, 1922.
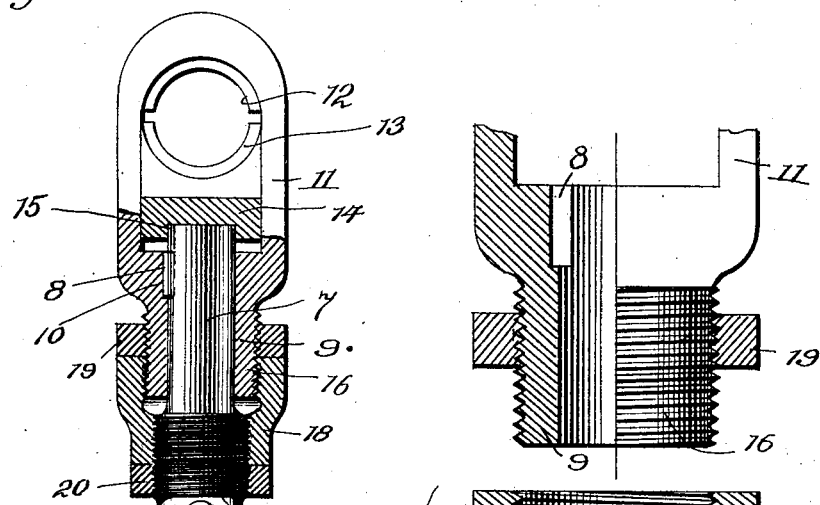
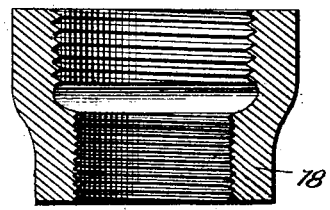
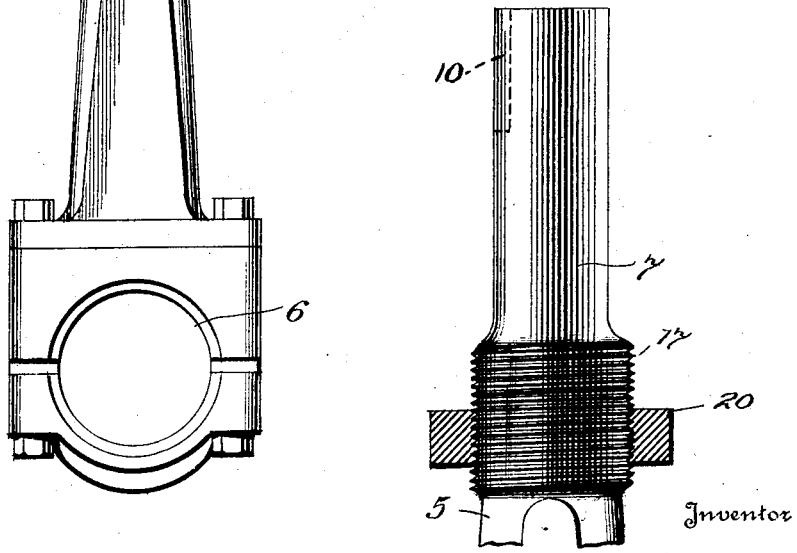

UNITED STATES PATENT OFFICE.

JOHN R. DU PRIEST, OF BALTIMORE, MARYLAND.

CONNECTING ROD.

1,417,307.  Specification of Letters Patent.  Patented May 23, 1922.

Application filed October 8, 1920. Serial No. 415,578.

*To all whom it may concern:*

Be it known that I, JOHN R. DU PRIEST, a citizen of the United States, residing at Baltimore, in the State of Maryland, have invented a certain new and useful Improvement in Connecting Rods, of which the following is a specification.

This invention relates to connecting-rod bearings, and particularly to means for adjusting the brasses thereof.

While available for general use the invention is especially useful in connection with the wrist-pin bearings of rods used with trunk pistons, because it permits ready and accurate adjustment while the piston, wrist-pin and rod are assembled. In trunk piston engines so constructed as to give access to the crank end of the piston, the adjustment can be made without withdrawing the piston from the cylinder.

One embodiment of the invention as applied to a wrist-pin bearing is shown in the accompanying drawing, in which:—

Fig. 1 is a side elevation, partly sectional of a complete connecting rod.

Fig. 2 is a fragmentary view on a larger scale showing the parts of the adjusting mechanism for the wrist-pin bearing separated from each other.

The rod 5 is provided at one end with a crank-pin bearing 6 of any form. At its other extremity it terminates in a cylindrical stub-end 7 provided with a key-way 10. Longitudinally slidable on this is a sleeve 9 provided with a key 8 which engages in key-way 10. The sleeve carries an eye or yoke 11 in which are assembled the bearing members or brasses 12 and 13 and a thrust block 14. The thrust block 14 is formed with a recess 15 to receive the stub-end 7 of rod 5. The block 14 may be omitted in which case the stub-end 7 would engage bearing member 13.

The sleeve 9 is externally threaded at 16, and, below the cylindrical end 7, the rod 5 is threaded at 17. The directions of pitches of the threads 16 and 17 are the same, but the lineal pitches of these threads are different. Thus the sleeve nut 18, which is threaded on both, produces when turned a slow relative movement of sleeve 9 on the cylindrical end 7 of rod 5. This movement, by means of the thrust of end 7 against block 14 adjusts bearing member 13 toward bearing member 12. The key 8 and key-way 10 prevent relative rotation of the sleeve and rod. Any equivalent construction to prevent such rotation may be used, or reliance may be placed on the nut locking means hereafter described and on the crank and wrist pins to maintain alinement.

The sleeve nut 18 is locked in place, when properly adjusted, by two check nuts 19 and 20. Various other nut locks are known equivalents for check nuts such as those shown, and I contemplate their substitution in certain cases.

The construction adopted is accessible, gives a refined and positive adjustment because of the slow movement imparted by the differential threads, and may be locked positively, when adjusted, without risk of destroying the adjustment. When used in connection with wrist-pin bearings for trunk pistons it overcomes the inherent difficulty in adjusting such bearings and facilitates withdrawal of the piston through the crank end of the cylinder. In single acting engines, where the connecting rod acts under load in thrust only, the adjusting threads are never subjected to heavy stresses, since the block 14 transmits the thrust of member 13 directly to the end of the rod. The seating of the end of the rod in a recess in block 14 assists to maintain alinement of the block and rod.

As stated, this construction for adjusting rod bearings is available for general use, and for example may be used for crank-pin as well as for wrist-pin bearings, as is obvious. Various changes in the details of construction may be made without departing from the inventive principle.

What is claimed is:

1. The combination of a rod; a yoke mounted to slide longitudinally thereon; bearing members mounted in said yoke and adjustable by the relative movement of said rod and yoke; and a member differentially threaded to said rod and said yoke and rotatable to adjust the same.

2. The combination of a rod; a yoke having a sleeve through which one end of said rod is longitudinally movable; means for preventing relative rotation of said rod and sleeve; an adjustable bearing mounted in said yoke and engaged by said rod; a nut encircling said rod and differentially threaded to said rod and sleeve; and means for locking said nut against rotation.

3. The combination of a rod, a yoke having a sleeve through which one end of said rod is longitudinally movable; an adjustable bearing structure mounted in said yoke and engaged by said rod; a nut encircling said rod and differentially threaded to said rod and sleeve; and means for locking said nut both to said sleeve and to said rod.

4. The combination of a rod; a yoke having a sleeve through which one end of said rod is longitudinally movable; a thrust block mounted in said yoke in engagement with the end of said rod; an adjustable bearing confined in said yoke and sustained by said thrust block, a nut encircling said rod and differentially threaded to said rod and sleeve; and releasable means for locking said nut against rotation.

5. The combination of a rod; a yoke having a sleeve through which one end of said rod is longitudinally movable; a thrust block mounted in said yoke in engagement with the end of said rod; an adjustable bearing confined in said yoke and sustained by said thrust block; a nut encircling said rod and differentially threaded to said rod and sleeve; means serving to prevent rotation of said rod in said sleeve; and releasable means for locking said nut against rotation.

In testimony whereof I have signed my name to this specification.

JOHN R. DU PRIEST.